J. W. CAUGHEY.
APPARATUS FOR MOLDING CONCRETE.
APPLICATION FILED MAY 15, 1917.
1,294,874.
Patented Feb. 18, 1919.
3 SHEETS—SHEET 1.
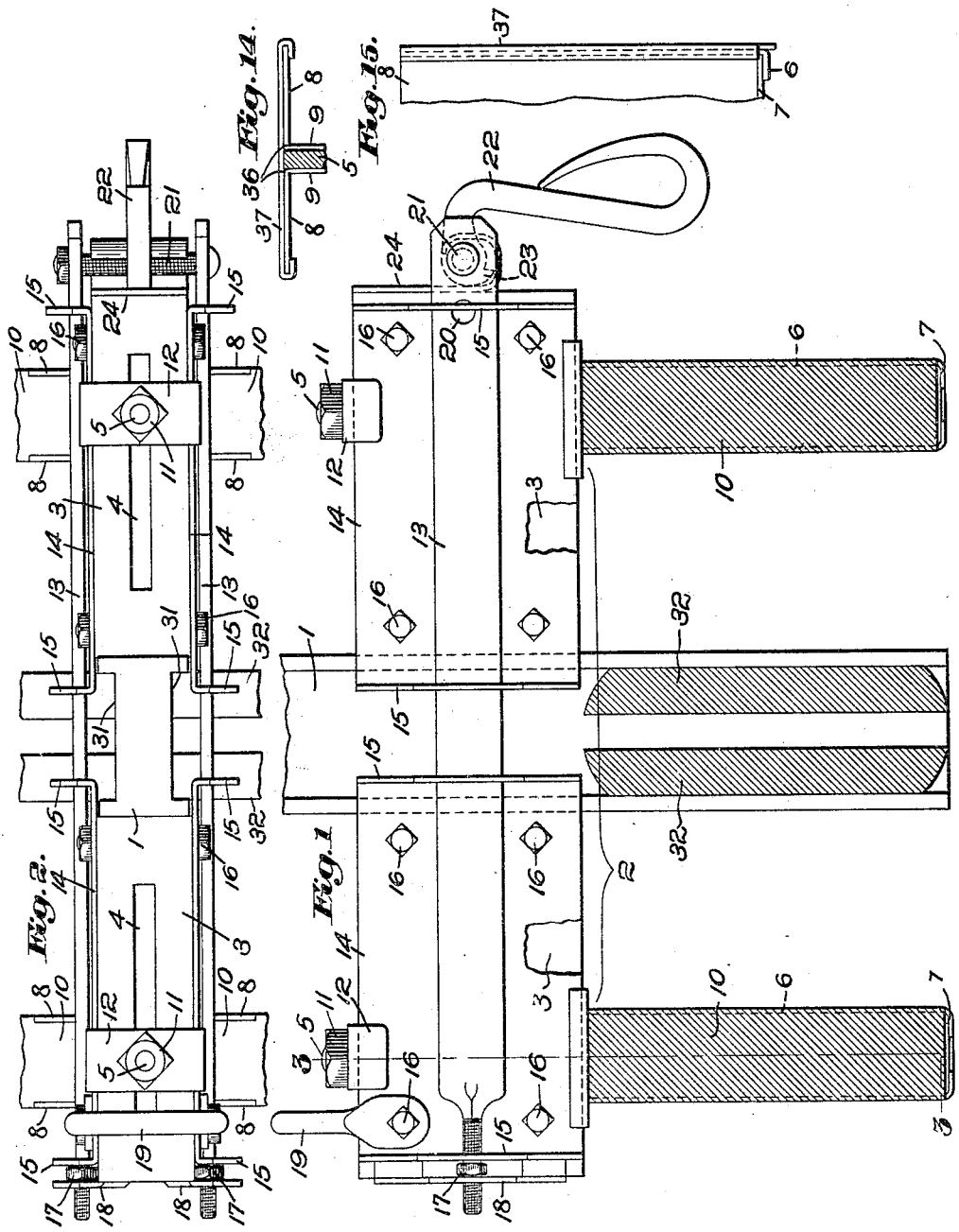
Inventor:
John W. Caughey.

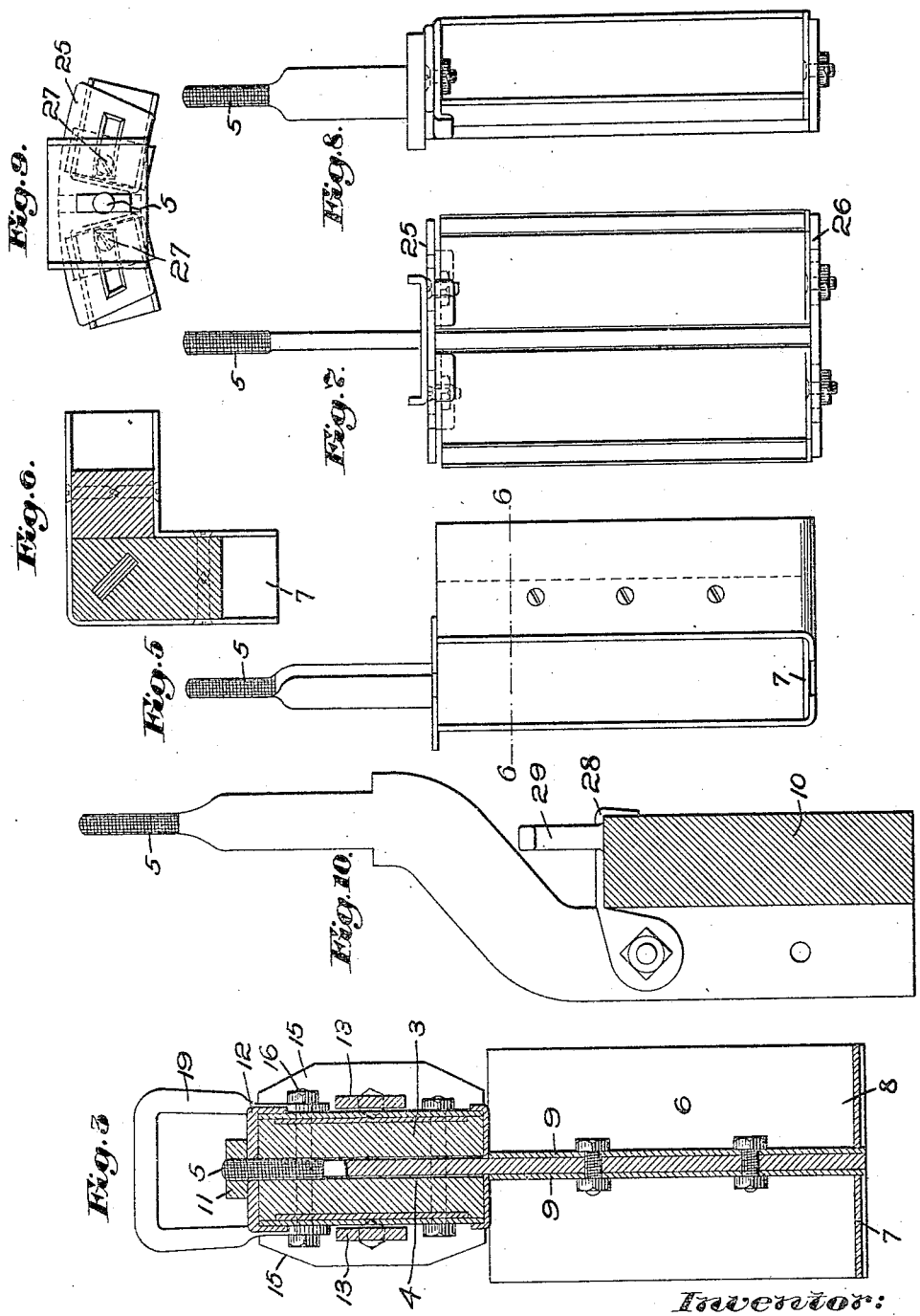

J. W. CAUGHEY.
APPARATUS FOR MOLDING CONCRETE.
APPLICATION FILED MAY 15, 1917.
1,294,874.
Patented Feb. 18, 1919.
3 SHEETS—SHEET 3.
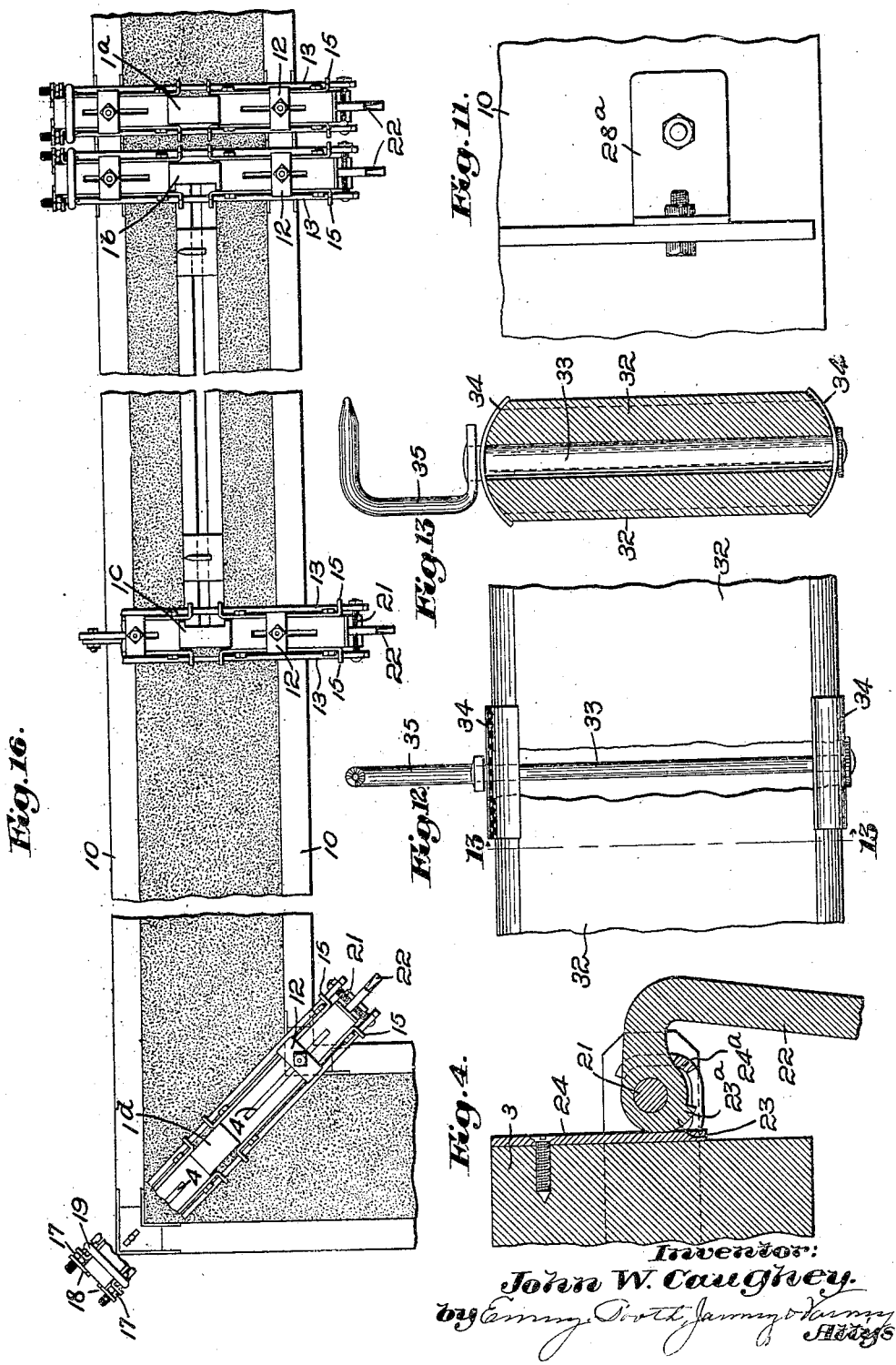
Inventor:
John W. Caughey.

UNITED STATES PATENT OFFICE.

JOHN W. CAUGHEY, OF WALTHAM, MASSACHUSETTS.

APPARATUS FOR MOLDING CONCRETE.

1,294,874.  Specification of Letters Patent.  Patented Feb. 18, 1919.

Application filed May 15, 1917. Serial No. 168,700.

*To all whom it may concern:*

Be it known that I, JOHN W. CAUGHEY, a citizen of the United States, and a resident of Waltham, county of Middlesex and State of Massachusetts, have invented an Improvement in Apparatus for Molding Concrete, of which the following description, in connection with the accompanying drawings, is a specification, like characters on the drawings representing like parts.

This invention relates to concrete molding apparatus and its object is to provide improved apparatus of the kind specified containing, among others, improvements hereinafter described and referred to, for the purpose of molding in sections either a solid or hollow wall, and contemplates the locking of an adjustable mold member in turn to a series of supports.

In the drawings of the embodiment of my invention illustrated and described herein—

Figure 1 is a side elevation of the clamp member in position for molding a wall, with the molding boards shown in cross-section;

Fig. 2 is a plan of the same;

Fig. 3 is a vertical section on the line 3—3, Fig. 1; from the right, the mold boards being omitted;

Fig. 4 is a detail of the clamp locking means;

Fig. 5 is a side elevation of a corner mold-board socket;

Fig. 6 is a cross-section of the same, on the line 6—6, Fig. 5;

Fig. 7 is a side elevation of an adjustable, angular mold-board socket;

Fig. 8 is an edge view of the same;

Fig. 9 is a top view thereof;

Fig. 10 is a side elevation partly in section of a mold-board bracing rod, and board thereon;

Fig. 11 is a detail of a modified form of the bracing rod locking means, the mold-board broken away;

Fig. 12 is a side elevation of a core-board carrier and its socket;

Fig. 13 is a vertical section of the same on the line 13—13, Fig. 12, from the left;

Fig. 14 is a top view of a mold board socket sheath for use in special cases;

Fig. 15 is a partial detail edge view of the socket and sheath shown in Fig. 13;

Fig. 16 is a diagrammatic view of the manner of using my novel apparatus for building a wall.

One object of the invention is to provide an apparatus that shall be not only less expensive to construct, owing to its simplicity but also less expensive to use on account of its novel structure, one important feature being that it can be operated from and with a single line of supporting posts or uprights, as between the two lines bounding the inner and outer faces of the wall or foundation. I thus avoid the necessity of running two wall lines with the consequent expense of labor and time, and danger of variation between the two lines.

To this end, the embodiment of my invention illustrated herein comprises, Figs. 1, 2, a clamp support 1 of convenient length and form in cross-section and adapted Fig. 16 to be positioned in suitable numbers to form a series of supports or uprights $1^a$, $1^b$, $1^c$, $1^d$ which supports may be either of wood, or channeled iron, as herein erected as presently described. These supports 1 may be of the height of the structure, and positioned as stated, at suitable intervals, according to the length of the mold-boards to be used, along a single line which may be an intermediate and preferably the center line, of the wall or foundation. These supports 1 may be driven into the ground, if the wall rests directly thereon, as where the wall rests upon a bed of clay, or if the wall is to be an inexpensive or temporary one, but I prefer to have a support of some kind for them, such as a board or a 2x4 joist, not shown, which may be laid lengthwise on the proposed center line of the posts 1, and the posts positioned upright thereon.

Each post carries, see Figs. 1, 2 and 16, a mold-board supporting and clamping member 2, which, as shown, consists of a plurality of blocks or jaws 3, each having one or more vertical slots 4 therein. By means of these slots 4, there is suspended in each jaw, Figs. 1, 2 and 3, a mold-board socket-carrying rod 5, having at its lower end a mold-board receiving socket 6, herein rectangular, consisting of a bottom 7, opposed side walls 8, and a back 9, adapted to receive the end of a mold plank or board 10 of convenient length. This plank end may be reduced in thickness to bring its side faces flush with the outer face of the sides 8 of the socket, see Fig. 2. The rod 5 is adjustably supported in the slot 4 by a nut 11 threaded thereon, which nut rests upon a plate 12, on the upper edge of the jaw 3.

To lock or clamp these jaws 3 upon and against the opposite sides of the post 1, I provide a novel means, illustrated as comprising jaw-carrying rods 13 on opposite sides of the jaws. To carry these rods 13, and support the jaws 3 in proper alinement any convenient means may be provided, as metal plates 14, the ends of which are turned laterally and slotted to form rod-receiving flanges 15. The plates 14 may be secured to the sides of each block 3 by bolts or screws 16.

One end of each rod 13 herein the left, Fig. 1, is threaded to receive a nut 17 thereon, which is positioned between the flange 15 on the plate 14 and a second plate 18 secured to the end of the adjacent block or jaw 3, or, if preferred, the rod end may be adjustably secured by any other convenient means. One end of one jaw 3, and preferably the one adjacent the threaded ends of the rod 13 described, may be provided with a pivoted or other convenient handle 19.

The opposite ends of each rod 13 are provided with a plurality of holes 20 for receiving a rod locking bolt or pin 21, which thus confines the jaws between the rods 13, and which pin carries a jaw locking handle 22, having thereon a cam surface 23 which is adapted to impinge on the plate 24 on the adjacent jaw end for closing the opposed jaws tightly against the post 1.

It will be obvious that the foregoing construction permits the rods 13 and cam carrying pin 21 to be readily adjusted to cause the jaws to grip a post of any width within certain limits, and at any point thereon.

For positively unlocking the jaws 3, Fig. 4, and separating them to permit free movement thereof on the support 1, I have curved upwardly a central portion of the lower end of the plate 24 to form a lip 24ª. To engage this lip and positively withdraw the adjacent jaw 3 from contact with the post 1, the cam 23 carries a tooth 23ª positioned to engage the lip 24ª when the handle 22 is raised.

For use where corners of the wall are to be built, two-piece corner or right-angle sockets (see Figs. 5, 6 and 16) are provided, which sockets may be readily substituted for the usual one-piece socket on the rod 5, without delay when required.

For angles greater or less than a right-angle, adjustable sockets are provided, Figs. 7 to 9. In such case, the rod 5 carries a plate 25 at the top of the socket 6, and a similar plate 26 at the bottom of the socket, both plates being slotted to receive screws 27 on the opposite ends of the sockets, whereby they may be adjusted to the desired angle and firmly held there by setting up the screws.

It is unnecessary however to provide each clamp with a socket 6. These sockets may be provided for clamps at the end of each plank, say every 15 feet, to receive and securely position the plank ends. Between these points however the planks or boards may be held in alinement and sufficiently firm to retain the cement between them by providing such intermediate clamps with socketless bracing rods 5, see Fig. 10, and provided with a mold board or plank clip or retaining member 28, which engages the edge of the plank firmly and holds it in position. It will be convenient in many cases to offset the rods 5, as shown in Fig. 10. This will permit the ready construction of an offset section of wall, if desired, as for instance to form a pilaster or post support at any particular point in the wall.

Obviously, the offset in the rod 5 may be of any degree, and sufficient, with the adjustment possible by means of the slot 4, in the jaw 3, if the offset rods are used instead of the usual rods 5, to permit the building of a wall of any increased width or an offset section of the wall between certain prescribed limits, and this adjustment of the rods can be readily and quickly made. The clip or lock 28 may have a catch 29 to serve as a handle for disengaging it from the plank 10. Or the rod 5 may be provided with one or more locking members consisting each of an angle iron 28ª which may be bolted or secured to the mold-board 10 and this arrangement will permit the board 10 to be raised with the clamp 2 when desired.

When a hollow wall is desired, the posts 1 may be channeled or I beams as already referred to, as at 31, Figs. 1 and 2, to receive the ends of the core boards 32. For supporting these core boards removably in position, Fig. 13 a core board supporting and locking rod 33 may be provided of irregular formation in cross-section or cam shaped, each rod carrying a plurality of sockets 34, so that after the wall has been built therearound, the boards 32 may be readily separated or moved from contact with the inner wall faces and toward each other, or the core collapsed, by turning the rod 33 partly around until its shorter diameter only separates the boards 32. If the core board sockets 34 are curvilinear, they will prevent the boards from falling apart when withdrawn from the wall.

The ends of the rods 33 may be headed over to hold the sockets thereon. The rods Fig. 13 may be provided with a handle 35 for lifting the boards, and for conveniently rotating the rod to separate the boards or spread the core or collapse it.

The method of using my invention is as follows: Referring to Fig. 16 posts 1 in sufficient number are set on a line within the inner and outer faces of the wall that is to be built, and preferably on the center line thereof, and to designate the points I have marked the posts in this figure 1ª, 1ᵇ, 1ᶜ, 1ᵈ, separated the length of the planks to be used, as for instance, fifteen feet. The post 1ᵈ is positioned at the corner.

The clamps 2, unlocked, are then adjusted on two or more of the posts to bring the mold board sockets at a suitable height for the first filling or layer of cement, and the clamps are properly spaced laterally, of course, to provide a wall of the proper width and then locked in position on the posts 1. The cement is then poured into the mold thus formed and permitted to harden in the usual manner, beginning preferably at a point corresponding to the right hand end of Fig. 15, the two clamps at 1ª and 1ᵇ being positioned side by side. Similar clamps are positioned in like manner at the half way point or directly opposite in the opposite wall, but not shown, as a convenient point to make a break in the work or end the first section thereof for a purpose to be presently explained. While the work has been going on as described other posts 1 will have been erected in advance of those already referred to working to the left and similar clamps 2 will be adjusted thereon and successive fillings poured as described until a first layer of cement has been laid preferably throughout the first section or half the length of the proposed wall. At this point, not shown, two more clamps 2 have been positioned as stated, side by side, as at the starting point. The work will thus continue to the point of beginning or end of the wall. By this time the cement in the first half of the section work or the first, i. e., as far as the two clamps opposite 1ª and 1ᵇ, described, is sufficiently hard to permit the withdrawal of the bold boards and core boards, if used, throughout the first section. The clamps 2 are released or unlocked from the posts 1 beginning with post 1ᵇ, throughout the first half of the work, by raising the handles 22 causing the teeth 23ª to engage the lip 24ª and draw the jaws 3 away from the posts 1 and the clamps with their mold boards 10 are then raised a sufficient height on the supports 1 for a second pouring or filling of cement as before. Only the first of the pair of clamps 2 opposite the starting point i. e. opposite post 1ᵇ is raised, however, leaving the second of the two in place until the second section is dry. After the second layer of the wall on the first section is completed, the clamps throughout the second half or section of the first layer of course are raised and a second pouring is made, completing the second layer of the wall.

This operation is repeated until the wall is brought up to the required height. It will be obvious that if it is desired to step the wall at intervals from the foundation up, this may readily be done by suitable adjustment of the mold board carrying sockets 2 and their boards 10 bringing them nearer together as may be desired to make the wall of the required and lessened width or thickness.

Of course, if a foundation is to be built for a bay-window, or if a laterally extended portion of the foundation wall is desired for any reason, the angular mold board sockets, illustrated in Figs. 7 and 8, will be used, the sockets having been previously adjusted to the required angle. It will be obvious that it will be unnecessary to provide a sufficient number of clamps initially to extend throughout the length of the wall if the wall is to be a long one, as the cement soon sets and the clamps and boards used in the first section may be removed after a short time and used on advanced portions of the work, the wall being left to harden without them. In fact, the wall will harden quicker without them after it sets sufficiently to hold its shape as the removal of the boards permits free access of the air to the wall surface.

Referring to Fig. 14 it will be noticed that where the inner faces of the mold board sockets abut the socket supporting rod 5, or at the joint of the sockets with the rod 5 there is left a narrow crack 36 and these slots leave upon the surface of the wall a slight ridge which, if the wall is to be left exposed, may be objectionable.

In such a case this difficulty may be obviated by the use of a sheath 37, see Figs. 14, and 15, which consists of a sheet of metal having its edges turned rearwardly and then longitudinally to engage the edges of the sides 8 of the sockets and which may be readily slipped down over these sides thereby presenting a smooth wall for the surface of the cement and avoiding any danger of the wall showing ridges or creases as it might otherwise do.

While the above embodiment of my invention provides a most satisfactory form of construction, it may be possible to vary the same in many respects within the spirit of the invention and the scope of the appended claims.

Claims:

1. Concrete molding apparatus comprising a clamp support, a clamp having jaws for engaging the support endwise, and mold board carrying members on the clamps.

2. Concrete molding apparatus comprising a clamp support, a clamp having support engaging jaws, mold-board carrying members on the clamp, and core receiving means on the support.

3. Concrete molding apparatus comprising a clamp having endwise acting jaws adapted to engage a single supporting member and mold-board supports thereon.

4. Concrete molding apparatus comprising a clamp adapted to engage a single supporting member and having adjustable jaws, and mold board supports adjustably carried thereby.

5. Concrete molding apparatus comprising a clamp support, a clamp thereon, mold board sockets suspended from the opposite ends of the clamp and adjustable thereon vertically and laterally, and core board receiving means in the clamp support.

6. Concrete molding apparatus comprising a clamp support having core receiving means, a clamp thereon, mold board sockets carried by the opposite ends of the clamp and adjustable thereon vertically and laterally, a core in the core receiving means comprising a holder of irregular shape, sockets thereon, core boards on opposite sides of the holder and supported by the sockets, and adapted to be separated by turning the holder axially.

7. Concrete molding apparatus comprising a channeled core receiving clamp support, a clamp adjustable thereon, mold board supports on the clamp and suspended therefrom on opposite sides of the clamp support, mold boards therefor, and a collapsible core seated in the support channel.

8. Concrete molding apparatus comprising a clamp having jaws adapted to engage an upright support, mold board supports suspended from opposite jaws, and mold boards therein.

9. Concrete molding apparatus comprising a clamp having jaws adapted to engage an upright support, mold board sockets adjustable on and suspended from the jaws, mold boards therein and clamp-locking means.

10. Concrete molding apparatus comprising a clamp having jaws adapted to engage a central support, mold board sockets suspended from the opposite jaws thereof, and adjustable vertically and laterally thereon, and mold boards therein.

11. The method of constructing a moldable wall, comprising erecting a line of supports between the outer lines of said wall, suspending mold members from said supports, positioning core members between and on the supports, pouring the first layer of the wall, raising the mold on the supports, collapsing and raising the core members between and in the supports, without removing them therefrom, pouring the second layer of the wall, continuing said operation until the wall is of the desired height, and finally removing the core and mold members therefrom.

12. Concrete molding apparatus comprising a clamp having laterally acting jaws, a central support for the same, means for locking the jaws to said support, mold board supports on the jaws, means for adjusting the mold board supports independently of the jaws, core board receiving means on the central support, and a collapsible core to coöperate with the support to construct a hollow wall.

13. Concrete molding apparatus comprising a clamp having jaws, locking means therefor comprising jaw-carrying rods adjustably secured to one jaw, and means to lock the jaws together and to a support, and mold board sockets on the jaws.

14. Concrete molding apparatus comprising a clamp having jaws, locking means therefor comprising jaw-carrying rods adjustably secured to one jaw, means to lock the jaws together and to a support, mold board socket supports on the jaws, and sockets angularly adjustable on the supports.

15. Concrete molding apparatus comprising a core having a plurality of core wall members, and a core supporting member therefor adapted to expand and collapse the core.

16. Concrete molding apparatus comprising a clamp having jaws, a cam carried thereby for locking them to a support, mold member supports on the jaws, and oppositely opening mold member sockets on the supports.

17. Concrete molding apparatus comprising a clamp having jaws adapted to close on a support, and an offset mold member support on a jaw, permitting construction of an offset wall section simultaneously with a straight wall section.

In testimony whereof, I have signed my name to this specification.

JOHN W. CAUGHEY.

Copies of this patent may be obtained for five cents each, by addressing the "Commissioner of Patents, Washington, D. C."